US006324188B1

(12) United States Patent
Tsuji

(10) Patent No.: US 6,324,188 B1
(45) Date of Patent: Nov. 27, 2001

(54) VOICE AND DATA MULTIPLEXING SYSTEM AND RECORDING MEDIUM HAVING A VOICE AND DATA MULTIPLEXING PROGRAM RECORDED THEREON

(75) Inventor: Keisuke Tsuji, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/069,152

(22) Filed: Apr. 29, 1998

(30) Foreign Application Priority Data

Jun. 12, 1997 (JP) .................................................. 9-155189

(51) Int. Cl.[7] ........................................................ H04J 3/12
(52) U.S. Cl. ........................... 370/537; 370/286; 370/443; 370/474; 375/222; 704/215; 704/233
(58) Field of Search ..................................... 370/286, 287, 370/289, 290, 435, 443, 444, 474, 535, 536, 537, 504, 505; 375/222, 231; 704/200, 215, 233, 253

(56) References Cited

U.S. PATENT DOCUMENTS

| 5,280,532 | * | 1/1994 | Shenoi et al. | 370/474 |
| 5,392,223 | * | 2/1995 | Caci | 364/514 |
| 5,687,229 | * | 11/1997 | Sih | 370/286 |
| 5,699,481 | * | 12/1997 | Shlomot et al. | 370/505 |
| 5,757,801 | * | 5/1998 | Arimilli | 370/444 |

FOREIGN PATENT DOCUMENTS

A5-227119   9/1993   (JP) .................................. H04J/3/17

* cited by examiner

Primary Examiner—Douglas Olms
Assistant Examiner—Shick Hom

(57) ABSTRACT

An input voice signal is passed from a voice signal encoding unit to a voice signal compressing unit so that it is encoded and compressed. No transmission of a silence signal within the voice signal to a multiplexing unit is performed in a silence signal eliminating unit. A multiplexing unit multiplexes the voice signal with a data to be transmitted which has been passed via a data terminal control unit and a data terminal control unit from a data terminal and is transmitted to a communication line via the transmission control unit. Lapse of a time-out period of time which is present in a timer is detected in a silence signal inserting unit so that a silence signal is generated and is reproduced in a voice signal decompressing unit and a voice signal decoding unit.

10 Claims, 7 Drawing Sheets

AN EXAMPLE OF MULTIPLEXED SIGNAL STREAM

VOICE AND DATA MULTIPLEXING SYSTEM AND RECORDING MEDIUM HAVING A VOICE AND DATA MULTIPLEXING PROGRAM RECORDED THEREON

BACKGROUND OF THE INVENTION

The present invention relates to a voice and data multiplexing system and in particular to a voice and data multiplexing system including a device for coding and compressing voices in which the voice and data signals are simultaneously transmitted in an efficient manner when voice and data frames which are multiplexed with each other are transmitted over the same communication line, and a recording medium on which a program used for multiplexing a voice and data is recorded and from which it is readable with a computer.

Multiplexing schemes have been developed for simultaneously transmitting voice and data signals over the same transmitting line. One of the examples may include a DSVD (Digital Simultaneous Voice and Data protocol) modem.

The DSVD modem is adapted to implement transmission of multiplexed voice and data signals by establishing a plurality of logical channels on an analog public line for transmitting voice code frame and data signal frames over different logical channels.

Both voice and data frames in the DSVD are transmitted as information frames which are defined by ITU-T recommendation V.42. In order to allocate voice and data frames to different logical channels on transmission, the DLCI (Data Link Connection Identifier) field value is set to 0 and 32 for data and voice frames, respectively, for transmission.

In an exemplary condition on transmission of multiplexed voice and data frames, the DLCI field value is specified and a voice frame and a data frame are transmitted over one and the same physical channel.

In order to efficiently use the restricted band width on a transmission line for transmission of voice signals, voice codes are periodically compressed with a compressing algorithm and the compressed voice codes are transmitted in the form of voice frames. Since the voice frames are used for transmission of conversation between both parties in this case, a multiplexer transmits voice frames preferentially to data frames so that conversation will not become intermittent.

On the receiving side, the compressed voice codes which are contained in received voice frames are decompressed for decoding voice signals.

When the input voice signal represents silence, the period of time in which the transmission line is occupied is shortened by transmitting a frame having a size which is smaller than that when a voice is present by using voice codes representing silence.

Since the data frames are transmitted in an interval between voice frames, the transmission rate of data frames changes with the changes in transmission rate of voice frames. The transmission is identical with that of the general V-series modem except that the transmission rate is dynamically changed.

In an exemplary configuration of the prior art DSVD modem, a transmission control unit, a multiplexing unit, a separating unit, voice signal compressing unit, a voice signal decompressing unit, a data terminal control unit, a voice signal coding unit, a voice signal decoding unit, a data terminal for transmitting and receiving data, a voice input device (microphone) such as telephone hand set and the like and a voice output device (speaker) such as telephone hand set and the like are provided with.

In the DSVD modem having such a configuration, the voice signal to be transmitted, which is input from the voice input device such as a microphone of the handset of a telephone set is coded in the voice signal coding unit and the coded signal is periodically compressed in the voice signal compressing unit.

A frame of the compressed voice codes to be transmitted is multiplexed with a frame of data to be transmitted which has been sent via the data terminal control unit and the multiplexed signal is transmitted to a communication line via the transmission control unit.

At this time, in the multiplexing unit a busy signal which informs that the voice signal is preferentially transmitted so that the transmission line is in a busy state is provided to the data terminal control unit. The data terminal control unit will inform the data terminal that the line is in a busy state in response to the given busy signal for performing flow control between the unit and the data terminal.

When the input voice is silent, a silence frame which is shorter in length than the frame when a voice is present is transmitted as a voice frame to shorten the period of time in which the transmission line is occupied.

The frames which are received from the public line are passed through the transmission control unit to the separating unit, in which they are separated into received voice and data signals. The received voice signal is decompressed in the voice decompressing unit and is decoded in the voice decoding unit and is fed to the voice output device such as a headphone of the handset of the telephone set.

On the other hand, the received data signal which has been separated by the separating unit is fed to the data terminal via the data terminal control unit.

Although the transmission rate of the data frame can be enhanced by transmitting a silence frame having a smaller size during a silent period of time in the abovementioned scheme, it is wasteful that the silence frames are repeatingly transmitted during the silent period of time since the silent time is continued for an extended period of time in the general conversation in comparison with the period of compression and coding of voice signal.

THE SUMMARY OF THE INVENTION

The present invention was made in view of the foregoing problem in the prior art. It is an object of the present invention to allocate the entire transmission band on a communication line to data transmission during a silent period of time by suppressing a voice frame representing silence in the transmitted voice in a system having means for encoding and compressing voice signal in which voice and data frames are multiplexed each other and transmitted over the same communication line, and further to provide a voice and data multiplexing system and a recording medium on which a voice and data multiplexing program is recorded for implementing the voice and data multiplexing system.

To accomplish the aforesaid object the present invention provides following improved system and medium used for this system:

(1) An invention resides in a voice and data multiplexing system including an encoding unit for encoding input voice signals to be transmitted, a compressing unit for compressing a stream of encoded voice signals which are generated by the encoding unit, a data terminal control unit for controlling and outputting input data to be transmitted, a multiplexing unit for multiplexing a frame of encoded voice signals through the compressing unit with a frame of data to be transmitted through the data terminal control unit and a transmission control unit for transmitting a stream of multiplexed signals which are generated by the multiplexing means, in which it further comprises an eliminating unit for eliminating the frame of a silence signal from the frames of encoded voice signals through the compressing unit to input only the frame of a voiced signal representing the presence of a voice to the multiplexing unit whereby the data to be transmitted is generated in the eliminated period of time to enhance the transmission efficiency.

(2) Another invention resides in a voice and data multiplexing system including an encoding unit for encoding input voice signals to be transmitted, a compressing unit for compressing a stream of encoded voice signals which are generated by the encoding unit, a data terminal control unit for controlling and outputting input data to be transmitted, a multiplexing unit for multiplexing a frame of encoded voice signals through the compressing unit with a frame of data to be transmitted through the data terminal control unit and a transmission control unit for transmitting a stream of multiplexed signals which are generated by the multiplexing means, in which it further comprises voice/silence detecting unit which determines as to whether the input voice signal represents the presence of a voice and outputs no the input voice signal if it represents silence and outputs the input voice signal to the encoding unit if it represents the presence of a voice whereby the transmit frame on silence is not generated to enhance the transmission efficiency.

(3) Another invention resides in a voice and data multiplexing system including a transmission control unit for receiving a stream of multiplexed signals from a communication line, a separating unit for separating the stream of multiplexed signals through the transmission control unit into a received voice signal and a received data signal, a data terminal control unit for controlling and outputting received data signal which has been separated by the separating unit, a decompressing unit for decompressing the received voice signal which has been separated by the separating unit, and a decoding unit for decoding the voice signal stream which has been generated by the decompressing unit into received voice signal, in which it further comprises a silence signal inserting unit for generating and outputting a silence voice signal to the decompressing unit by detecting a time-out state in which the received voice signal which has been separated by the separating unit is not received for a given period of time whereby a voice can be correctly reproduced from the transmitted signal in which voice and data signals are multiplexed.

(4) Another invention resides in a voice and data multiplexing system including a transmission control unit for receiving a stream of multiplexed signals from a communication line, a separating unit for separating the stream of multiplexed signals through the transmission control unit into a received voice signal and a received data signal, a data terminal control unit for controlling and outputting received data signal which has been separated by the separating unit, a decompressing unit for decompressing the received voice signal which has been separated by the separating unit, and a decoding unit for decoding the voice signal stream which has been generated by the decompressing unit into received voice signal, in which it further comprises a silence voice signal outputting unit for generating and outputting a silence voice signal to the output device by detecting a time-out state in which the received voice signal which has been generated by the decoding unit is not received for a given period of time whereby a voice can be correctly reproduced from the transmitted signal in which voice and data signals are multiplexed.

(5) Another invention resides in the invention as mentioned of (3) or (4) above, in which the detection of the time-out state is conducted in response to a signal representing the lapse of a preset time-out period of time of a timer which is resettable by the input of the voice signal.

(6) Another invention resides in a recording medium having a voice and data multiplexing program recorded thereon for functioning a computer as encoding means for encoding input voice signals to be transmitted, compressing means for compressing a stream of encoded voice signals which are generated by the encoding means, data terminal control means for controlling and outputting input data to be transmitted, multiplexing means for multiplexing a frame of encoded voice signals through the compressing means with a frame of data to be transmitted through the data terminal control unit, transmission control means for transmitting a stream of multiplexed signals which are generated by the multiplexing means, and eliminating means for eliminating the frame of a silence signal from the frames of encoded voice signals through the compressing means to input only the frame of a voiced signal representing the presence of a voice to the multiplexing means whereby the transmit data is transmitted in a period of time in which the frame of the silence signal is eliminated to enhance the transmission efficiency.

(7) Another invention resides in a recording medium having a voice and data multiplexing program recorded thereon for functioning a computer as encoding means for encoding input voice signals to be transmitted, compressing means for compressing a stream of encoded voice signals which are generated by the encoding means, data terminal control means for controlling and outputting input data to be transmitted, multiplexing means for multiplexing a frame of encoded voice signals through the compressing means with a frame of data to be transmitted through the data terminal control unit, transmission control means for transmitting a stream of multiplexed signals which are generated by the multiplexing means, and presence of voice/silence detecting means which determines as to whether the input voice signal represents the presence of a voice and outputs no the input voice signal if it represents silence and outputs the input voice signal to the encoding means if it represents the presence of a voice whereby a voice can be correctly reproduced from the transmitted signal in which voice and data signals are multiplexed.

(8) Another invention resides in a recording medium having a voice and data multiplexing program recorded thereon for functioning a computer as transmission control means for receiving a stream of multiplexed signals from a communication line, separating means for separating the stream of multiplexed signals through the transmission control means into a received voice signal and a received data signal, data terminal control means for controlling and outputting received data signal which has been separated by the separating means, decompressing means for decompressing the received voice signal which has been separated by the separating means, decoding means for decoding the voice signal stream which has been generated by the decompressing means into received voice signal, and silence signal inserting means for generating and outputting a silence voice signal to the decompressing means by detecting a time-out state in which the received voice signal which has been separated by the separating means is not received for a given period of time whereby a voice can be correctly reproduced from the transmitted signal in which voice and data signals are multiplexed.

(9) Another invention resides in a recording medium having a voice and data multiplexing program recorded thereon for functioning a computer as transmission control means for receiving a stream of multiplexed signals from a communication line, separating means for separating the stream of multiplexed signals through the transmission control means into a received voice signal and a received data signal, data terminal control means for controlling and outputting received data signal which has been separated by the separating means, decompressing means for decompressing the received voice signal which has been separated by the separating means, decoding means for decoding the voice signal stream which has been generated by the decompressing means into received voice signal, and silence voice signal outputting means for generating and outputting a silence voice signal by detecting a time-out state in which the received voice signal which has been generated by the decoding means is not received for a given period of time whereby a voice can be correctly reproduced from the transmitted signal in which voice and data signals are multiplexed.

(10) Another invention resides in the invention as mentioned of (8) or (9) above, in which the detection of the time-out state is conducted in response to a signal representing the lapse of a preset time-out period of time of a timer which is resettable by the input of the voice signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

PREFERRED EMBODIMENT OF THE INVENTION

Prior to explaining preferred embodiments of the present invention, prior art voice and data multiplexing system will be described below as references for the present invention.

The present invention relates to a voice and data multiplexing system and in particular to a voice and data multiplexing system including a device for coding and compressing voices in which the voice and data signals are simultaneously transmitted in an efficient manner when voice and data frames which are multiplexed with each other are transmitted over the same communication line, and a recording medium on which a program used for multiplexing a voice and data is recorded and from which it is readable with a computer.

Multiplexing schemes have been developed for simultaneously transmitting voice and data signals over the same transmitting line. One of the examples may include a DSVD (Digital Simultaneous Voice and Data protocol) modem.

The DSVD modem is adapted to implement transmission of multiplexed voice and data signals by establishing a plurality of logical channels on an analog public line for transmitting voice code frame and data signal frames over different logical channels.

Both voice and data frames in the DSVD are transmitted as information frames which are defined by ITU-T recommendation V.42. In order to allocate voice and data frames to different logical channels on transmission, the DLCI (Data Link Connection Identifier) field value is set to 0 and 32 for data and voice frames, respectively, for transmission.

Figure 1:
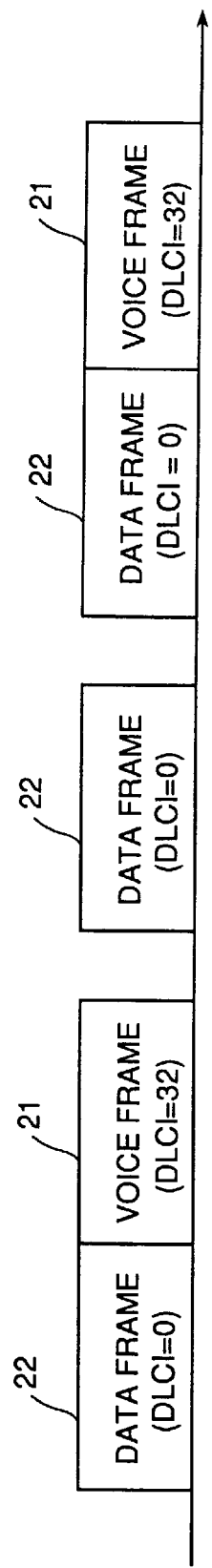
FIG. 1 shows a diagram showing an example of transmission of the multiplexed voice and data frames.

An exemplary condition on transmission of multiplexed voice and data frames is shown in FIG. 1. As shown in FIG. 1, the DLCI field value is specified and a voice frame 21 and a data frame 22 are transmitted over one and same physical channel.

In order to efficiently use the restricted band width on a transmission line for transmission of voice signals, voice codes are periodically compressed with a compressing algorithm and the compressed voice codes are transmitted in the form 6f voice frames. Since the voice frames are used for transmission of conversation between both parties in this case, a multiplexer transmits voice frames preferentially over data frames so that conversation will not become intermittent.

On the receiving side, the compressed voice codes which are contained in received voice frames are decompressed for decoding voice signals.

When the input voice signal represents silence, the period of time in which the transmission line is occupied is shortened by transmitting a frame having a size which is smaller than that when a voice is present by using voice codes representing silence.

Since the data frames are transmitted in an interval between voice frames, the transmission rate of data frames changes with the changes in transmission rate of voice frames. The transmission is identical with that of the general V-series modem except that the transmission rate is dynamically changed.

Figure 2:
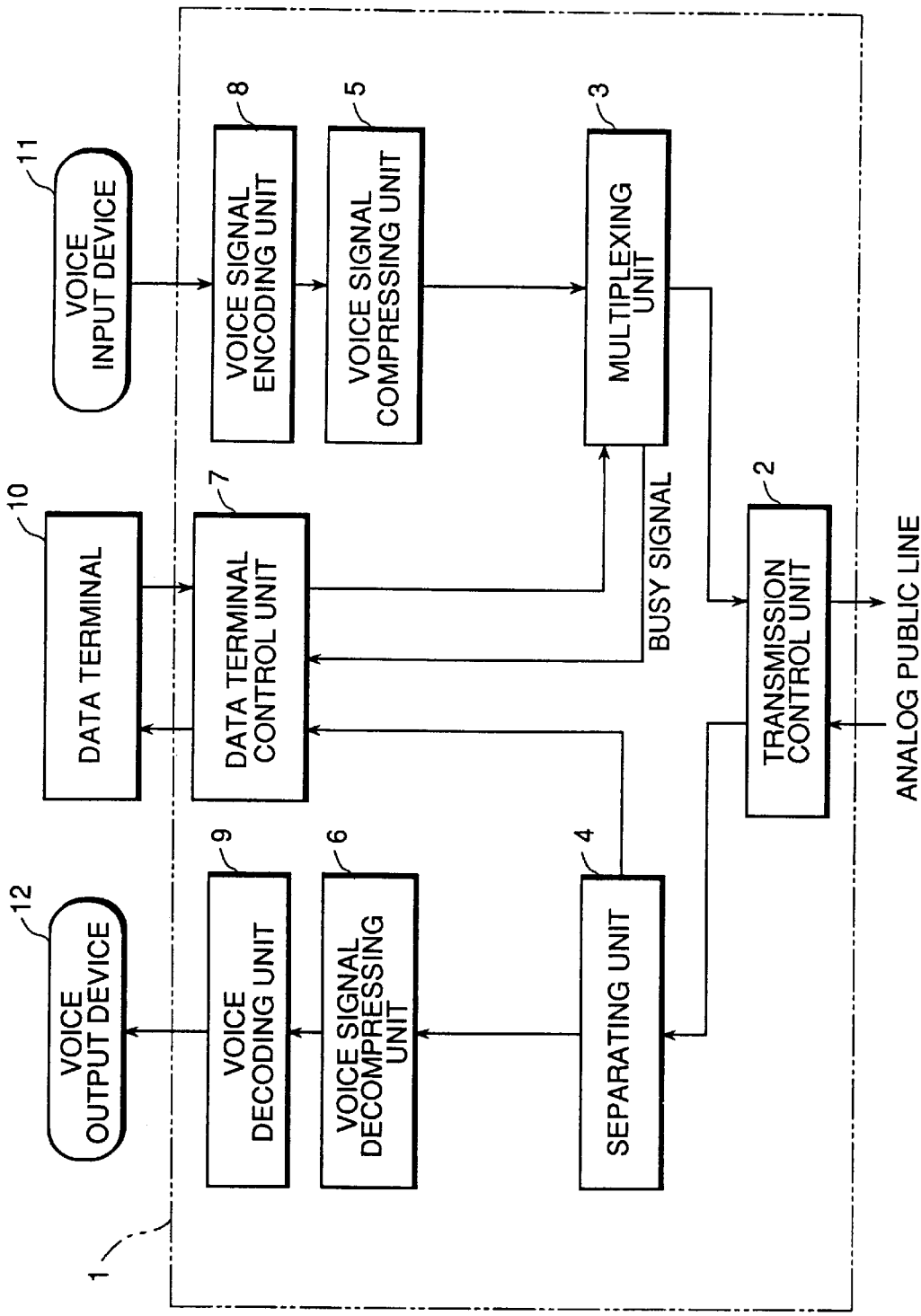
FIG. 2 shows a block diagram showing an exemplary configuration of a DSVD modem in the prior art.

FIG. 2 shows an exemplary configuration of the prior art DSVD modem.

In FIG. 2, a reference numeral denotes 2, a transmission control unit; 3, a multiplexing unit; 4, a separating unit; 5, voice signal compressing unit; 6, a voice signal decompressing unit; 7, a data terminal control unit; 8, a voice signal coding unit; and 9, a voice signal decoding unit.

A reference numeral 10 denotes, a data terminal for transmitting and receiving data; 11, a voice input device (microphone) such as telephone hand set and the like; and 12 a voice output device (speaker) such as telephone hand set and the like are provided with.

In the DSVD modem 1 having such a configuration, the voice signal to be transmitted, which is input from the voice input device 11 such as a microphone of the handset of a telephone set is coded in the voice signal coding unit 8 and the coded signal is periodically compressed in the voice signal compressing unit 5.

A frame of the compressed voice codes to be transmitted is multiplexed with a frame of data to be transmitted which has been sent via the data terminal control unit 7 and the multiplexed signal is transmitted to a communication line via the transmission control unit 2.

At this time, in the multiplexing unit 3 a busy signal which informs that the voice signal is preferentially transmitted so that the transmission line is in a busy state is provided to the data terminal control unit 7. The data terminal control unit 7 will inform the data terminal 10 that the line is in a busy state in response to the given busy signal for performing flow control between the unit 7 and the data terminal 10.

When the input voice is silent, a silence frame which is shorter in length than the frame when a voice is present is transmitted as a voice frame to shorten the period of time in which the transmission line is occupied.

The frames which are received from the public line are passed through the transmission control unit 2 to the separating unit 4, in which they are separated into received voice and data signals. The received voice signal is decompressed in the voice decompressing unit 6 and is decoded in the voice decoding unit 9 and is fed to the voice output device 12 such as a headphone of the handset of the telephone set.

On the other hand, the received data signal which has been separated by the separating unit 4 is fed to the data terminal 10 via the data terminal control unit 7.

Although the transmission rate of the data frame can be enhanced by transmitting a silence frame having a smaller size during a silent period of time in the above-mentioned scheme, it is wasteful that the silence frames are repeatingly transmitted during the silent period of time since the silent time is continued for an extended period of time in the general conversation in comparison with the period of compression and coding of voice signal.

Now, embodiments of the present invention will be described with reference to drawings. Since the components which are identical in function with those of the prior art shown in FIG. 2, the description of them is cited and description thereof will be omitted for simplicity.

Figure 3:
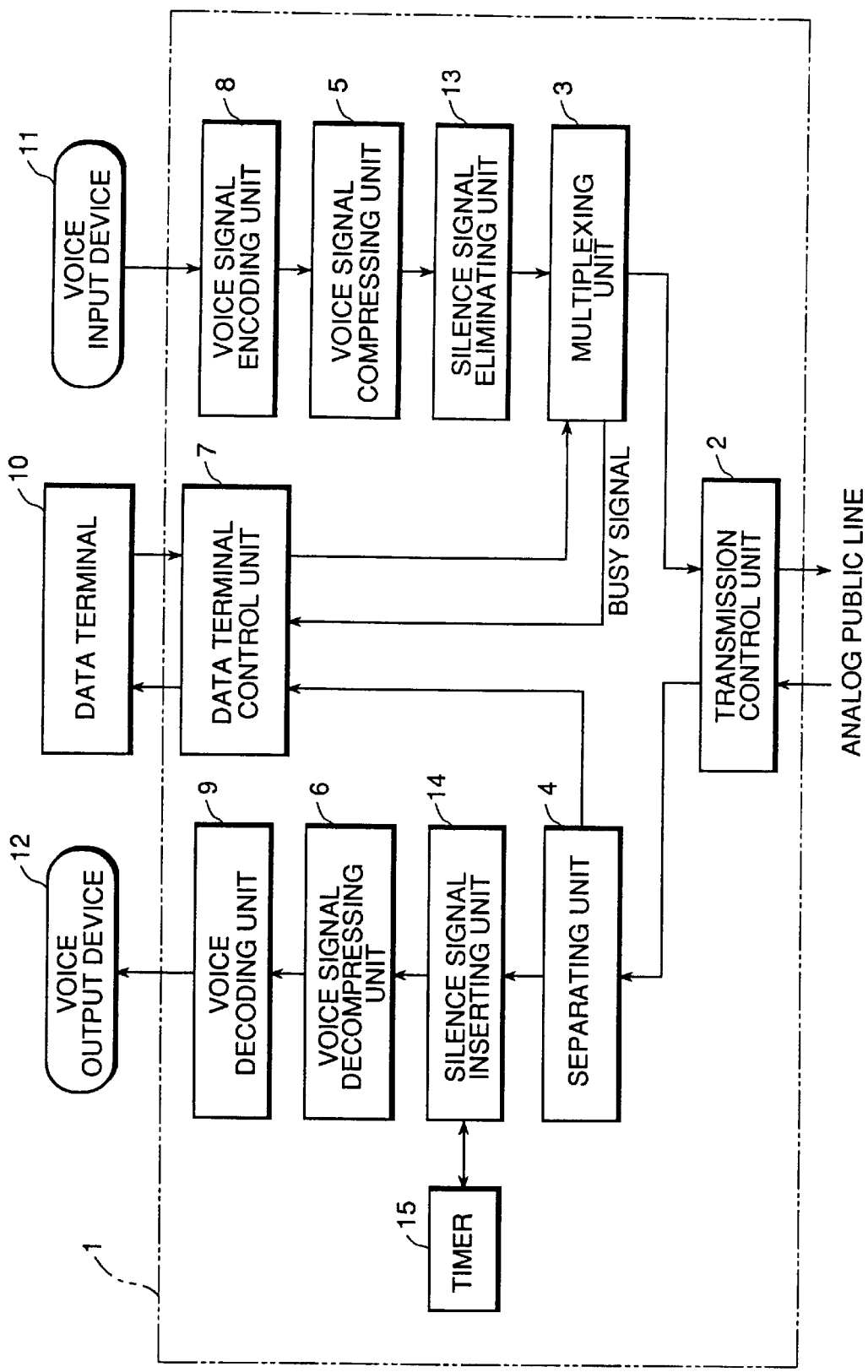
FIG. 3 shows a block diagram schematically showing one embodiment of a voice and data multiplexing system of the present invention.

FIG. 3 is a schematic block diagram showing one embodiment of a voice and data multiplexing system of the present invention.

In FIG. 3, a voice signal which is inputted via the voice input device 11 passes through the voice signal encoding unit 8 and then the voice signal compressing unit 5 in a voice and data multiplexing unit 3 for encoding and compressing.

The compressed voice signal is subjected to an examination as to whether the signal represents silence or voice in a silence signal eliminating unit 13. If the signal represent a voice, the voice signal would be fed to the multiplexing unit 3 without processing it. If the signal represents silence, no transmission to the multiplexing unit 3 would be performed.

The multiplexing unit 3 multiplexes received voice signal with data to be transmitted which has been received via the data terminal control unit 7 from the data terminal 10 and transmits frames via the transmission control unit 2 to a communication line such as analog public line.

Figure 4:
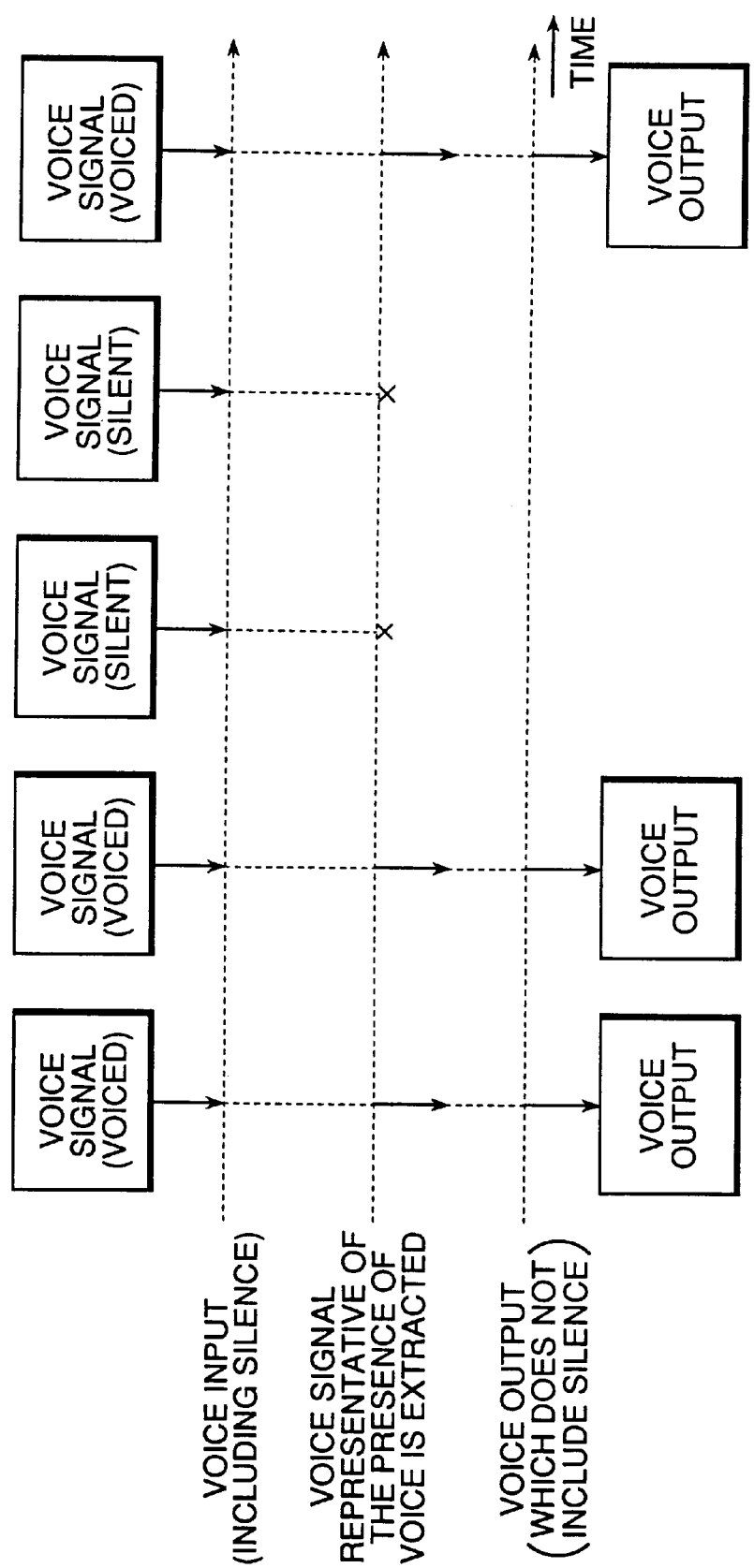
FIG. 4 shows a time chart showing an example of the operation sequence of the silence signal eliminating unit 13 in FIG. 3, the lapse of time being represented on the abscissa.

FIG. 4 shows an exemplary sequence of the operation of the silence signal eliminating unit 13, the lapse of time being denoted along the abscissa.

The drawing shows that for the sequence of voice signal inputs including both voiced and silence signals, the silence signal is not extracted, by only the voiced signal representative of the presence of voice is extracted so that it is output as a voice signal.

Figure 5:
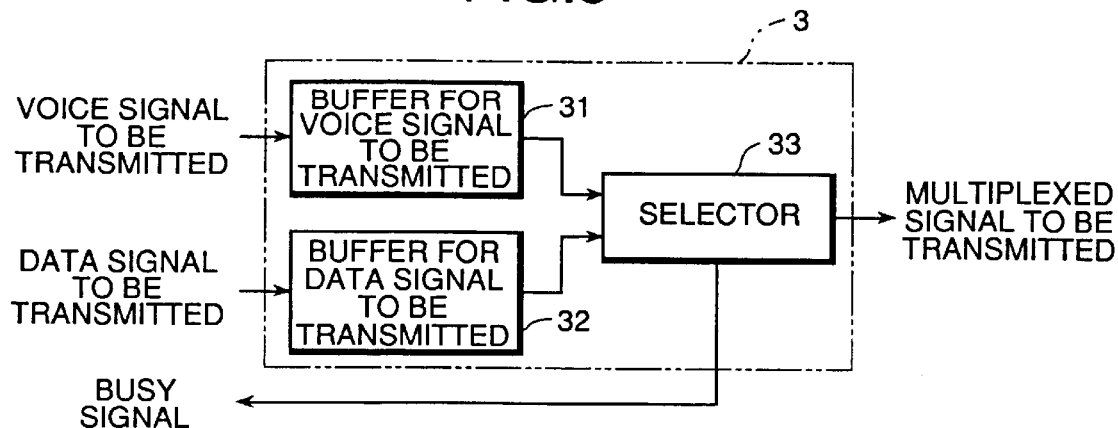
FIG. 5 shows a block diagram showing an exemplary configuration of the multiplexing unit 3 shown in FIG. 3 in more detail.

FIG. 5 is a schematic block diagram showing an example of detailed configuration of the multiplexing unit 3 shown in FIG. 3.

Buffers for voice and data signal to be transmitted 31 and 33 in FIG. 5 are adapted to receive and store the voice and data signals, respectively. The selector 33 determines whether or not the respective buffers store signals to be transmitted and reads out and transmits them if any.

If the voice signal is present in the buffer, it would be output preferentially to the data signal and the communication line would be occupied on transmission of signal. Accordingly, a busy signal informing of the occupation of the line is output.

In FIG. 3, the frame which has been received via the communication line (analog public line) and the transmission control unit 2 will be separated into a voice and data signals by the separating unit 4. The voice signal is passed to the voice decompressing unit 6 via a silence signal inserting unit 14 without being processed.

In the silence signal inserting unit 14, counting is commenced by resetting a timer 15 when the unit 14 receives the voice signal from the separating unit 4. When a preset time-out period of time expires, the timer 15 informs the silence signal inserting unit 14 of the silence. The silence signal inserting unit 14 which receives this notification will generate a silence signal and sends it to a received voice signal decompressing unit 6.

The voice signal which has been decompressed by the voice decompressing unit 6 is decoded in the voice signal decoding unit 9 and the decoded signal is output to the voice output device 12.

The received signal which has been separated by the separating unit 4 will be sent to the data terminal 10 via the data terminal control unit 7.

Figure 6:
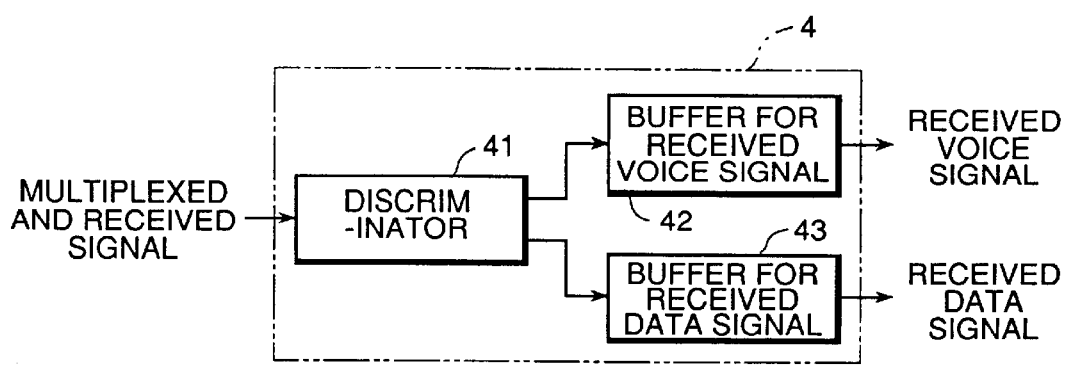
FIG. 6 shows a diagram showing an exemplary configuration of the separating unit 4 shown in FIG. 3 in more detail.

FIG. 6 is a schematic block diagram showing an example of the detailed configuration of the separating unit 4 shown in FIG. 3. A discriminator 41 in FIG. 6 discriminates first the received frame signal into voice and data frames, which are then stored in a buffer for received voice signal 42 and a buffer for received data signal 43, respectively. The signals in respective buffers are read out by the voice signal decompressing unit 6 and data terminal control unit 7 for their processing.

Figure 7:
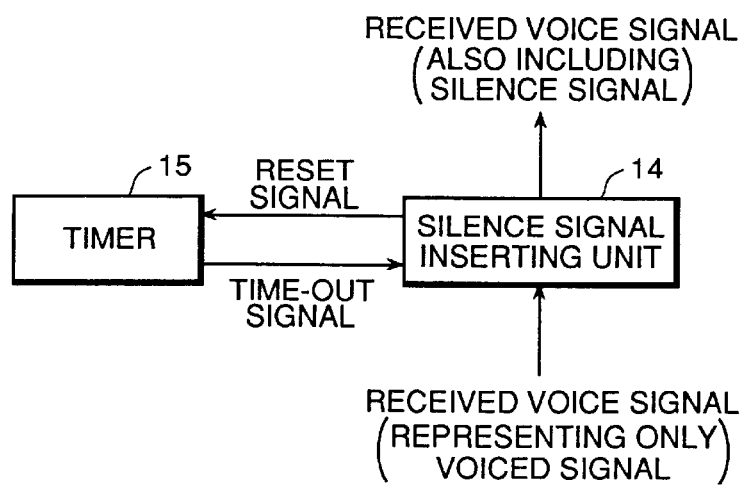
FIG. 7 shows a block diagram showing the detail of signals which are exchanged between the silence signal inserting unit 14 and the timer 15 in FIG. 3.

FIG. 7 is a schematic block diagram showing signals which are exchanged between the silence signal inserting unit 14 and the timer 15 in detail.

When the silence signal inserting unit 14 receives the voice signal, it provides a reset signal to the timer 15 to reset it for starting counting and simultaneously sends the received voice signal.

When the time-out period of time has lapsed, the timer 15 sends a time-out signal to the silence signal inserting unit 14, which then provides and sends a silence signal in response thereto.

The time-out period of time which is to be preset in the timer 15 is preset to the period of voice decompression and decoding plus a margin of delay which occurs on transmission. For example, transmission of the voice frame is suspended for the transmission of the data frame. Accordingly, the arrival of voice signal is delayed maximally by the period of decompression and decoding minus the time which is taken to transmit one data frame. The time-out period of time including this delay time is thus preset.

Figure 8:
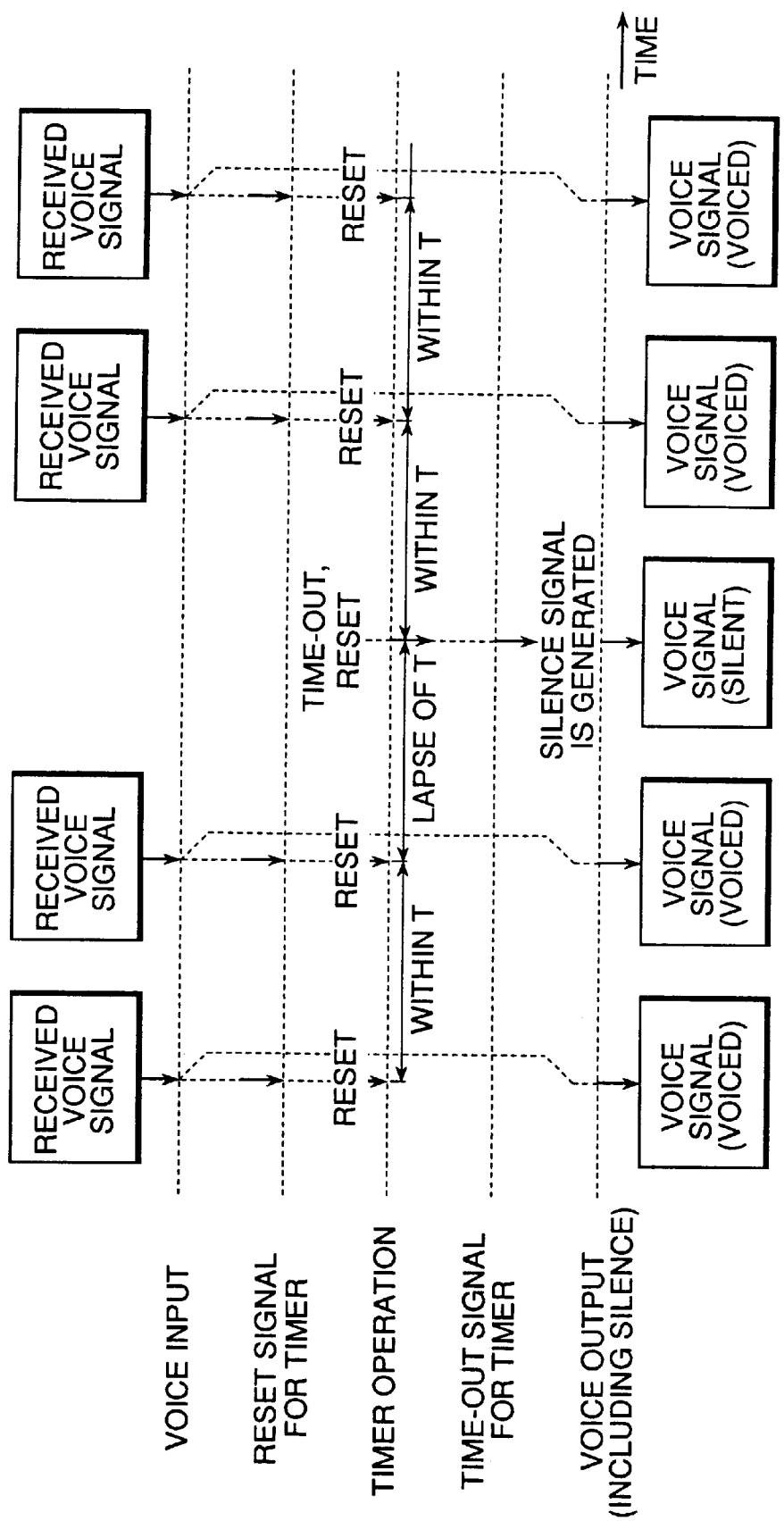
FIG. 8 shows a time chart showing an example of the sequence of the operation of the silence signal inserting unit 14 and the timer 15 in FIG. 7.

FIG. 8 is a schematic block diagram showing an example of the sequence of the operation of the silence signal inserting unit 14 and the timer 15. In the drawing, the abscissa denotes the lapse of time and T denotes the lapse of time-out period of time.

When the voice signal is input, the signal is output without conversion and simultaneously with this, the timer is reset. The timer commences counting since it is reset. If the timer is not reset within the preset time-out period of time, it would output a time-out signal and reset itself.

A silence signal is generated due to the output time-out signal and it is sent to the output.

In the above-mentioned embodiment, transmit voice signal encoding and compressing algorithms and received voice signal decompressing and decoding algorithms which are identical with those in the prior art DSVD modem may be used without any modification. If the other algorithms are used, only voice signal encoding and compressing units 8 and 5 on the side of transmission and voice signal decompressing and decoding units 6 and 9 are required to be replaced and no conversion to enable the silent voice signal to be processed in accordance with the present invention is required. The present invention provides such an advantage over prior art.

Figure 9:
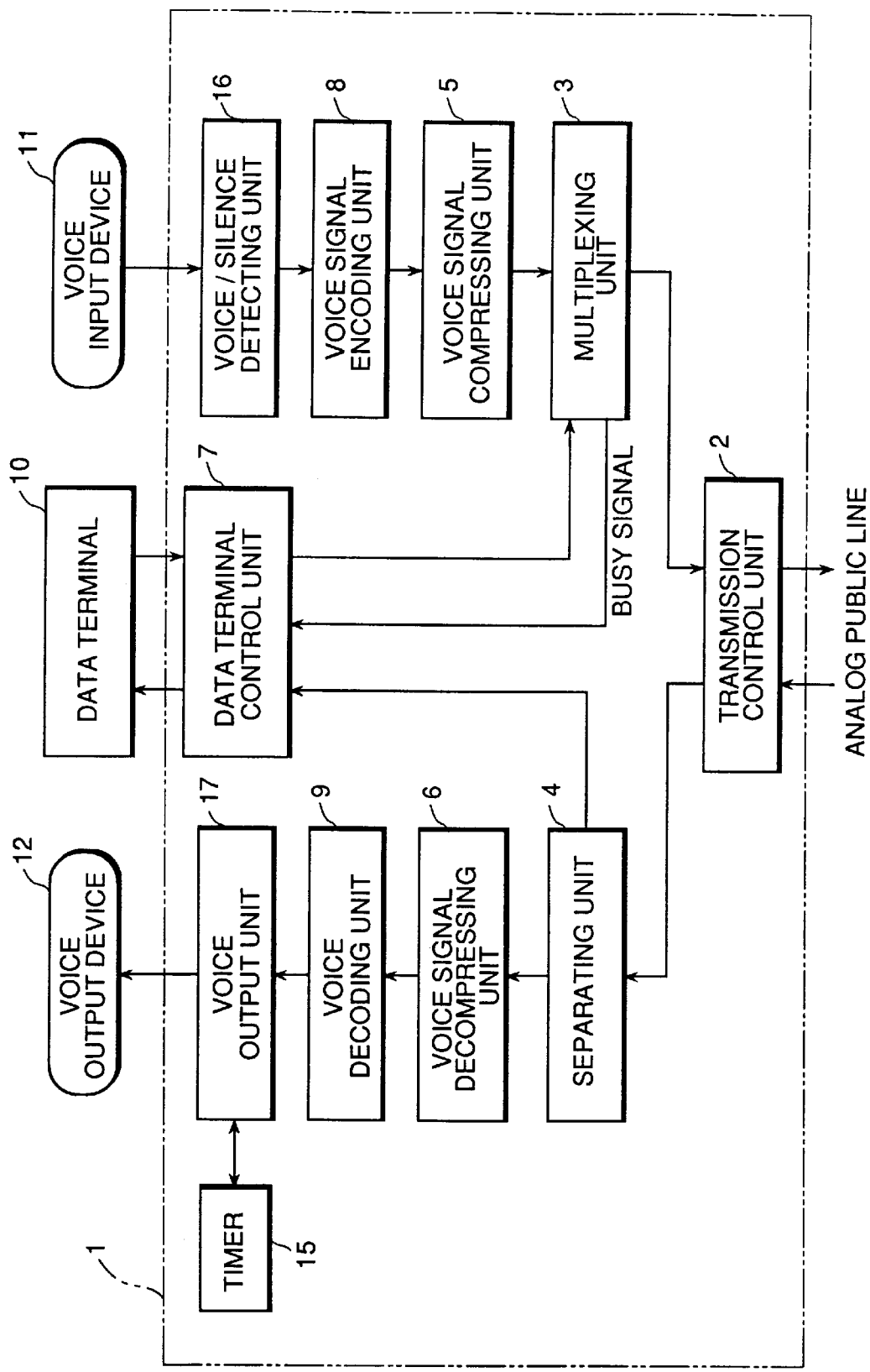
FIG. 9 shows a block diagram schematically showing another embodiment of the voice and data multiplexing system of the present invention.

FIG. 9 is a schematic block diagram showing another embodiment of the voice and data multiplexing system of the present invention.

The description of the below-mentioned components which are identical with those in the above-mentioned embodiment will be omitted for simplicity, since the foregoing description is cited.

In FIG. 9, a voice/silence detecting unit 16 determines whether the voice signal inputted from the voice input device 11 represents a voiced or silent. If it detects a voiced signal, the voiced signal to be transmitted is sent to the voice signal encoding unit 8 and thereafter transmitted to a transmission line (analog pubic line) via the voice signal compressing unit 5, multiplexing unit 3, and the transmission control unit 2.

The voice signal encoding unit 8, voice signal compressing unit 5, multiplexing unit 3, transmission control unit 2, data terminal 10 and data terminal control unit 7 which are associated with data signal to be transmitted are identical in operation with those in the above-mentioned embodiment. The sequence of operation of the voice/silence detecting unit 16 is identical with the case shown in FIG. 4.

In this configuration, voice signal from voice input device is not supplied to the voice signal encoding unit 8 when the signal represent silence. Accordingly, compression is conducted for only the voiced signal representing the presence of a voice.

In FIG. 9, a frame which has been received from the transmission line is passed via the transmission control unit 2 and is separated into a voice and data signals. The data signal is sent to the data terminal 10 via the data terminal control unit 7 while the voice signal is decompressed in the voice signal decompressing unit 6 and is decoded in the voice decoding unit 9.

The decoded voice signal is passed through the voice output unit 17 and is set to the voice output device 12 without being processed.

The voice output unit 17 determines whether or not a received voice signal is present within a time-out period of time by using the timer 15. If it is not present, the voice output unit 17 would output a voice signal representing silence to the voice output device 17. In this embodiment, the transmission control unit 2, separating unit 4, voice signal decompressing unit 6, voice signal decoding unit 9, data terminal control unit 7, data terminal 10 and the voice output device 12 are identical with those in the foregoing embodiment. The sequence of the operation the voice output unit 17 is identical with that shown in FIG. 8.

In above-mentioned configuration, necessity of processing on silence in the voice signal encoding unit 8 and voice signal compressing unit 5 on the transmission side and the voice signal decompressing unit 6 and the voice decoding unit 9 is omitted. Accordingly, an advantage is provided that the structure of these units can be simplified.

Each of functional unit in the voice and data multiplexing system of the present invention may be implemented by executing a program which is recorded in a computer readable recording medium in a computer. However, it is of course that each of units may be implemented by hardware.

Advantageous effects according to the present inventions as follows:

(1) Wasteful transmission of a silence frame which has been conducted in the prior art may be omitted by suppressing transmission of a voice frame carrying a voice signal for a period of silence of input voice. This, the transmission capacity which the communication line possesses can be fully utilized for transmission of a data frame(s) for carrying data signals for a period of the silence. It is possible to enhance the transmission efficiency by efficiently utilizing the transmission band width of the communication line.

(2) If a multiplexed signal which has been generated and transmitted by the system according to the present invention is separated into voice and data signals, the voice signal would be preferenced to the data signal. Further the data signal is inserted in an interval in which the voice signal is representative of silence on the side of transmission. Accordingly, by detecting a preset time-out state in this silent period of time which is used by the data signal on reproduction of the voice signal, a newly produced silence signal is inserted into the decoded and reproduced signal so that reproduction of correct signal can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A voice and data multiplexing system comprising:

an encoding unit for encoding input voice signals to be transmitted;

a compressing unit for compressing the encoded voice signals generated by the encoding unit;

a data terminal control unit for controlling and outputting input data to be transmitted;

a multiplexing unit for multiplexing a frame of encoded voice signals through the compressing unit with a frame of data to be transmitted through the data terminal control unit;

a transmission control unit for transmitting multiplexed signals generated by the multiplexing unit; and an eliminating unit for eliminating a frame of a silence signal from the frames of encoded voice signals through the compression unit to input only the frame of a voice signal representing the presence of a voice to the multiplexing unit.

2. A voice and data multiplexing system comprising:

an encoding unit for encoding input voice signals to be transmitted;

a compressing unit for compressing the encoded voice signals generated by the encoding unit;

a data terminal control unit for controlling and outputting input data to be transmitted;

a multiplexing unit for multiplexing a frame of encoded voice signals through the compressing unit with a frame of data to be transmitted through the data terminal control unit;

a transmission control unit for transmitting the multiplexed signals generated bit the multiplexing unit; and voice/silence detecting unit which determines whether or not an input voice signal represents the presence of a voice and which does not output one of the input voice signals if it represents silence and which outputs each of the input voice signals if each of the input voice signals represents the presence of voice.

3. A voice and data multiplexing system comprising:

a transmission control unit for receiving multiplexed signals from a communication line;

a separating unit for separating the received multiplexed signals through the transmission control unit into a received voice signal and a received data signal;

a data terminal control unit for controlling and outputting the received data signal separated by the separating unit;

a decompressing unit for decompressing the received voice signal separated by the separating unit;

a decoding unit for decoding the voice signal generated by the decompressing unit, into a received voice signal; and a silence signal inserting unit for generating and outputting a silence voice signal to the decompressing unit by detecting a time-out state wherein a voice signal is not received for a given period of time.

4. A voice and data multiplexing system comprising:

a transmission control unit for receiving multiplexed signals from a communication line;

a separating unit for separating the multiplexed signals through the transmission control unit into a received voice signal and a received data signal;

a data terminal control unit for controlling and outputting the received data signal separated by the separating unit;

a decompressing unit for decompressing the received voice signal separated by the separating unit;

a decoding unit for decoding the voice signal generated by the decompressing unit into a received voice signal; and a silence voice signal outputting unit for generating and outputting a silence voice signal to an output device by detecting a time-out state wherein a voice signal is not received for a given period of time.

5. The voice and data multiplexing system as defined in claim 3 or 4, wherein the detection of the time-out state is conducted in response to a signal representing a lapse of a preset time-out period of time of a timer, resettable by the input of a voice signal.

6. A recording medium having a voice and data multiplexing program recorded thereon for causing a computer to function, the program comprising:

encoding segment for encoding input voice signals to be transmitted;

compressing segment for compressing the encoded voice signals generated by the encoding segment;

data terminal control segment for controlling and outputting input data to be transmitted;

multiplexing segment for multiplexing a frame of encoded voice signals with a frame of data to be transmitted;

transmission control segment for transmitting multiplexed signals; and eliminating segment for eliminating a frame of a silence signal from the frames of encoded voice signals to send only the frame of a voice signal representing the presence of voice for multiplexing.

7. A recording medium having a voice and data multiplexing program recorded thereon for causing a computer to function, the program comprising:

encoding segment for encoding input voice signals to be transmitted;

compressing segment for compressing the encoded voice signals generated by the encoding segment;

data terminal control segment for controlling and outputting input data to be transmitted;

multiplexing segment for multiplexing a frame of encoded voice signals with a frame of data to be transmitted;

transmission control segment for transmitting the multiplexed signals; and presence of voice/silence detecting segment which determines whether or not an input voice signal represents the presence of a voice and which does not output one of the input voice signals if it represents silence and which outputs each of the input voice signals for encoding if each of the input voice signals represents the presence of voice.

8. A recording medium having a voice and data multiplexing program recorded thereon for causing a computer to function, the program comprising:

transmission control segment for receiving multiplexed signals from a communication line;

separating segment for separating the multiplexed signals into a received voice signal and a received data signal;

data terminal control segment for controlling and outputting the received data signal which has been separated;

decompressing segment for decompressing the received voice signal which has been separated;

decoding segment for decoding the voice signal into a received voice signal; and silence signal inserting segment for generating and outputting a silence voice signal by detecting a time-out state wherein a voice signal is not received for a given period of time.

9. A recording medium having a voice and data multiplexing program recorded thereon for causing a computer to function, the program comprising:

transmission control segment for receiving multiplexed signals from a communication line;

separating segment for separating the multiplexed signals into a received voice signal and a received data signal;

data terminal control segment for controlling and outputting the received data signal which has been separated;

decompressing segment for decompressing the received voice signal which has been separated;

decoding segment for decoding the voice signal into a received voice signal; and silence voice signal outputting segment for generating and outputting a silence voice signal by detecting a time-out state wherein a voice signal is not received for a given period of time.

10. The recording medium having the voice and data multiplexing program recorded thereon as defined in claim 8 or 9, wherein the detection of the time-out state is conducted in response to a signal representing a lapse of a present time-out period of time of a timer, resettable by the input of a voice signal.

* * * * *